United States Patent [19]

Hudson et al.

[11] 4,196,179

[45] Apr. 1, 1980

[54] PROCESS FOR PREPARING HIGH CYCLIC PHOSPHONITRILIC HALIDES

[75] Inventors: John W. Hudson; Thomas F. Dominick, both of Baton Rouge, La.

[73] Assignee: Ethyl Corporation, Richmond, Va.

[21] Appl. No.: 592,875

[22] Filed: Jul. 3, 1975

[51] Int. Cl.$^2$ .............................................. C01B 25/10
[52] U.S. Cl. .................................................... 423/300
[58] Field of Search ......................................... 423/300

[56] References Cited

U.S. PATENT DOCUMENTS

| | | | |
|---|---|---|---|
| 3,359,080 | 12/1967 | Ridgway et al. | 423/300 |
| 3,658,487 | 4/1972 | Wunsch et al. | 423/300 |
| 3,780,162 | 12/1973 | Bergeron | 423/300 |
| 3,860,693 | 1/1975 | Graham | 423/300 |

*Primary Examiner*—O. R. Vertiz
*Assistant Examiner*—Gregory A. Heller
*Attorney, Agent, or Firm*—Donald L. Johnson; John F. Sieberth; James M. Pelton

[57] ABSTRACT

Preparation of high cyclic phosphonitrilic halide, preferably chloride, oligomer mixtures by reaction of phosphorus trichloride, chlorine and ammonia at temperatures from 65° to 180° C. in which the reactants are simultaneously fed to an agitated inert solvent at a rate such that the phosphorus trichloride concentration is at most stoichiometric relative to the chlorine and ammonia concentration and such that petroleum ether insoluble phosphonitrilic chloride formation is suppressed, and recovering the cyclic phosphonitrilic halide oligomer mixture without extracting petroleum ether insoluble materials since these are not produced.

17 Claims, No Drawings

PROCESS FOR PREPARING HIGH CYCLIC PHOSPHONITRILIC HALIDES

BACKGROUND OF THE INVENTION

This invention relates to a process for the preparation of cyclic phosphonitrilic halide oligomer mixtures. Cyclic phosphonitrilic halide, especially the chloride, and particularly the cyclic trimeric and tetrameric phosphonitrilic chloride species are of interest for their use as intermediates for agricultural chemicals, as intermediates for fire retardants, as coatings for ceramics and metals, and in the preparation of polymers having unique glass transition point, solvent resistance and high and low temperature properties.

Processes heretofore employed for the preparation of phosphonitrilic chlorides, or chlorophosphazenes, usually produce a significant proportion of higher cyclic materials and linear materials which are less desirable for some applications. Eliminating these less desirable high cyclic and linear phosphonitrilic species is a goal which has eluded researchers, except by extensive purification procedures which are costly, require large capital investment and waste reactor productivity and raw materials.

The prior art teaches several general approaches toward the desired goal through control of the reaction. For example, high dilution of the reactants appears to favor increased cyclic content, Allcock, *Phosphorus-Nitrogen Compounds*, Academic Press, New York (1972), p. 122. Also, the use of an excess of finely divided ammonium chloride particles favors increased cyclic content; see U.S. Pat. No. 3,367,750. Further, the slow and even addition of one reactant to the other appears to favor higher cyclic contents, although the prior art differs somewhat on this point. One line of patents indicates that slow and even addition of $PCl_5$ to $NH_4Cl$ favors increased cyclic content; see U.S. Pat. Nos. 3,667,922 and 3,367,750. Another group prefers the addition of $NH_3$ to a solution of $PCl_5$ to increase cyclics; see U.S. Pat. Nos. 3,656,916 and 3,658,487.

More recently, U.S. Pat. No. 3,780,162 to Bergeron teaches the preparation of phosphonitrilic chloride mixtures by reacting phosphorus pentachloride in inert solvent with ammonia introduced at a specified rate and with the reaction mixture being under HCl pressure. Also, Graham, U.S. Pat. No. 3,860,693 teaches production of phosphonitrilic chlorides prepared by in situ preparation of ammonium chloride followed by in situ preparation of phosphorus pentachloride with subsequent reaction to give the phosphonitrilic chloride mixture. Both of these processes prepare amounts of petroleum ether insoluble phosphonitrilic chloride oligomers which must be separated from the desired cyclic species, usually by extraction of cyclics into petroleum ether or paraffinic hydrocarbons, e.g., heptane and the like.

Accordingly, there still remains a need for a process which prepares only the petroleum ether soluble materials with a high proportion of cyclic trimeric and tetrameric phosphonitrilic chlorides. Such a process which eliminates the need for extensive purification and extraction from linears is provided by the process of the present invention. In addition, the present invention provides better utilization of raw materials, less by-products for waste disposal and increased yield of desired products. Other advantages will be apparent from the following description of the invention.

The Invention

In accord with the present invention there is provided a process for the preparation of phosphonitrilic chloride mixtures containing a high proportion of cyclic trimer and tetramer and substantially no petroleum ether insoluble phosphonitrilic chloride species, said process comprising reacting phosphorus trichloride, chlorine and ammonia in a stirred solvent at a temperature of from 65° to about 180° C., wherein the reactants are simultaneously added to said solvent at a rate such that the concentration of phosphorus trichloride is at most stoichiometric relative to the concentration of chlorine and ammonia and such that the formation of petroleum ether insoluble phosphonitrilic chloride is suppressed, and recovering the cyclic phosphonitrilic chloride mixture produced.

The reactants for the process of the invention are phosphorus trichloride, preferably in liquid form and gaseous chlorine and ammonia. Each of these materials is conveniently available and relatively inexpensive in commercial quantities. Also, employed in the process of this invention is a solvent which can be a liquid inert to the reactants or substantially inert at the reaction temperature. Polar solvents are useful and the greater the polarity of the solvent the better its function in the present invention. Preferably the solvent has a boiling point in the range of about 65° to about 180° C. Such solvents allow the reaction to proceed preferably under reflux conditions, but the boiling point should be sufficiently low so that the solvent may be removed afterwards from the phosphonitrilic chloride without polymerization to higher molecular weight materials. Typical of such solvents are halogenated, preferably chlorinated, hydrocarbons having a boiling point in the range of 65° to about 160° C. For example, 1,1,2,2-tetrachloroethane, chloroform, benzyl chloride, monochlorobenzene, dichlorobenzene, trichlorobenzene and the like are illustrative. Preferably, the solvent employed is a halogenated, e.g., chlorinated, benzene with monochlorobenzene being particularly preferred because of its boiling point, ease of separation from the product, low toxicity and low cost.

In general, the solvent is charged to the reactor and agitation is begun to facilitate contact of the reactants and minimize hot spots. The type of agitation is not critical and can be accomplished by conventional means, preferably such as a stirrer. Then the solvent is heated to the initiation temperature of the reaction and the reactant flows are begun. In a preferred aspect of the invention, the solvent can be saturated with hydrogen chloride so that on contact with ammonia there is formed a finely divided dispersion of ammonium chloride. This dispersion is ready to initiate the reaction of the phosphorus trichloride, and chlorine and ammonia to produce the product. Alternately, instead of saturating the solvent initially with hydrogen chloride, the ammonia and chlorine feed can be started and produce an amount of finely divided ammonium chloride sufficient to initiate the reaction prior to feeding the phosphorus trichloride. However, if this alternate is employed, it is important to insure that the phosphorus trichloride feed is not begun until sufficient ammonium chloride is present to initiate the reaction. Without limiting the invention to any particular theory or reaction mechanism, it is believed that the presence of phosphorus trichloride concentrations in amounts greater than stoichiometric amounts relative to the concentrations of ammonia and chlorine present in the reaction mixture will result in formation of petroleum ether insoluble phosphonitrilic chloride species which are not desired.

The initiation temperature of the reaction is about 65° C. under atmospheric conditions. Preferably, the solvent is heated to at least this temperature, however, it is preferred to begin feeding reactants at a temperature between about 65° and 95° C. At temperatures within this range the reaction initiates and proceeds at good rate after heating to solvent reflux conditions.

Once the initiation temperature is reached, the reactants are fed or added to the reactor at a rate such that the concentration of phosphorus trichloride is at most stoichiometric relative to the concentrations of chlorine and ammonia, but not in such amounts that petroleum ether insoluble phosphonitrilic chloride species are formed. The mode of addition does not appear to be critical since all reactants are fed substantially simultaneously. Thus, the reactants can be added continuously or intermittently as long as the above-indicated stoichiometric ratio of reactants is maintained. Preferably, the reactants are continuously fed to the reaction mixture in equimolal proportion. It has been found convenient to add the chlorine and ammonia to the reaction mixture below the liquid level in the reactor so that these gaseous reactants are not vented through the reflux condenser with HCl formed during the reaction. The phosphorus trichloride can be added either above or below the liquid surface, as desired.

The reactants are conveniently added to the reaction mixture in stoichiometric or equimolal proportions and amounts for a period sufficient to produce the desired cyclic phosphonitrilic chloride and suppress formation of petroleum ether insoluble phosphonitrilic chloride species. For convenience in a batch process operation, the reactants are fed to the reaction mixture for a period sufficient to result in a solution of not more than about 70 weight percent of phosphorus as phosphorus trichloride in the amount of solvent if no reaction had occurred. That is, the maximum amount of phosphorus as $PCl_3$ to be fed is calculated on not more than a 70 weight percent solution of $PCl_3$ in the amount of solvent used. Preferably, the reactants are fed to the reaction mixture in equimolal proportion for a period sufficient to result in a solution of $PCl_3$ of about 20 to about 50 weight percent in said solvent if no reaction occurred. For a continuous process, of course, the reactants are fed continually with removal of a portion of the reaction mixture and separation of product from solvent which is recycled to the reactor. In a batch system, the length of feeding depends on the size of the reactor, capability of the reflux condenser, heat transfer limitations and ability to control the feeding of reactants. Simultaneous feed of reactants has been carried out for periods of about 4 to about 8 hours in relatively small equipment. Similar feed times or longer or shorter feeding periods can be used depending on the heat transfer capabilities and size of the reaction vessel and associated equipment, reactor loading and good engineering practices and economics.

After the simultaneous feed is discontinued reflux conditions can be maintained to complete the reaction and allow the remaining HCl formed to be vented. The time during which reflux conditions are maintained is not critical so long as conditions and concentrations of reactants employed are sufficient to prevent further reaction and polymerization of the product. It is believed that no further reaction takes place after evolution of HCl has ceased, e.g., about 15 minutes from discontinuance of the simultaneous feed. Reflux conditions have been maintained for up to about 20 hours without adverse effects on the product. Preferably, after discontinuing the feeding of reactants the reaction mixture is maintained at reflux until hydrogen chloride evolution has ceased and for a period up to about 20 hours thereafter. The product cyclic phosphonitrilic chloride mixture is then recovered.

The process of the present invention produces phosphonitrilic chloride mixtures containing a high proportion of cyclic trimer and tetramer and substantially no petroleum ether insoluble phosphonitrilic chloride material. Thus, product recovery is simplified by eliminating the need to extract with petroleum ether. Any means conventionally available to skilled practitioners can be used to recover the cyclic phosphonitrilic chloride mixture. In general, the reaction mixture is cooled to ambient conditions, filtered to remove by-product ammonium chloride and the solvent is removed by evaporation, distillation, flashing or other similar means from the product. If close control of the simultaneous reactant feed has not been achieved, small amounts of linear phosphonitrilic chlorides will be produced and a sample should be checked after filtration to determine the amount, if any, of these materials. If substantial amounts of petroleum ether insoluble materials are found, the filtrate from the reactor should be extracted to completely remove them. However, it is an advantage of the process of this invention that substantially no petroleum ether insoluble materials are formed and the extraction thereof can be eliminated.

The product cyclic phosphonitrilic chloride mixture has the general formula

$$(PNCl_2)_x$$

wherein x is an integer from 3 to about 7. Analysis of the product by NMR shows small amounts of other petroleum ether soluble phosphonitrilic chloride materials. Upon evaporation of the solvent, the product is a white semi-crystalline solid mass having from 85 to about 90 percent combined cyclic phosphonitrilic chloride oligomers, principally, trimer and tetramer with the remainder being cyclic pentamer, hexamer, heptamer and other material and substantially no petroleum ether insoluble phosphonitrilic chloride species. The ratio of cyclic trimer to tetramer can range from 6:1 to 9:1.

The process of the present invention can be further described by reference to the following illustrative and nonlimiting examples. Unless otherwise mentioned, all parts and percentages are by weight.

EXAMPLE 1

To a reactor equipped with reflux condenser and vent, stirrer, reactant feed dip legs, thermometer and heating means was charged 1712 parts of monochlorobenzene. The monochlorobenzene was saturated with HCl. Then the heater and stirrer were turned on and when the temperature reached 90° C., there was simultaneously added to the reactor 750 parts of $PCl_3$, 95.7 parts of $NH_3$, and 385 parts of $Cl_2$ in equimolal amounts over a period of 6 hours. The reaction mixture reached reflux at 129° C. about 30 minutes after the simultaneous addition began and the temperature varied between 128°–132° C. during the addition. After feeding was discontinued, the heating and refluxing at about 135° C. was continued for about 18 hours.

Then the reactor contents were cooled to ambient temperature and the reaction mass weighed about 2075.5 parts.

The reaction mass was stirred and a sample weighing 600 parts was removed, filtered and 115.5 parts of solid and 465.4 parts of filtrate were obtained. The remainder of the reaction mass was filtered and the monochlorobenzene evaporated. A portion of the product was extracted twice with petroleum ether and no insoluble materials was observed. Analysis by NMR gave the following results:

| Cyclic PNCl$_2$ Oligomer | Percent |
| --- | --- |
| Trimer | 76.5 |
| Tetramer | 10.1 |
| Pentamer | |
| Hexamer | 6.3 |
| Heptamer | 1.1 |
| Other | 6.1 |

Yield based on phosphorus trichloride charged was 99.1 percent.

EXAMPLE 2

Following the procedure of Example 1, there was simultaneously added 750 parts of PCl$_3$, 387 parts of Cl$_2$ and 94.7 parts of NH$_3$ in about equimolal proportions over a period of 6 hours. The temperature of the reaction mass increased from 90° C. at the beginning of the addition to reflux at 130° C. after 40 minutes. After addition reflux temperature was maintained for about 18 hours. Work-up and analysis of the product as in Example 1, showed no petroleum ether insoluble phosphonitrilic chlorides. The cyclic phosphonitrilic chloride product was analyzed by NMR with the following results:

| Cyclic PNCl$_2$ Oligomer | Percent |
| --- | --- |
| Trimer | 77.8 |
| Tetramer | 11.1 |
| Pentamer | |
| Hexamer | 6.1 |
| Heptamer | 0.8 |
| Other | 4.1 |

Yield based on PCl$_3$ was 86.0 percent.

EXAMPLE 3

Following the procedure of Example 1, there was simultaneously added to 1712 parts of monochlorobenzene saturated with HCl, in equimolal amounts, 750 parts of PCl$_3$, 94 parts of NH$_3$, and 387 parts of Cl$_2$ over a period of 4 hours. Addition was started after the monochlorobenzene reached 95° C. and reflux was obtained in about 30 minutes thereafter. However, feed control was not maintained during the addition and PCl$_3$ was added slightly ahead of the stoichiometric balance. Reflux was continued overnight. The reaction mass obtained on work-up was yellow in color and extraction of the reaction mass indicated 11.2 parts of petroleum ether insoluble materials which are presumed to be linear phosphonitrilic chloride oligomers. Analysis of the product by NMR gave the following results:

| Cyclic PNCl$_2$ Oligomer | Percent |
| --- | --- |
| Trimer | 70.3 |
| Tetramer | 8.1 |
| Pentamer | |
| Hexamer | 6.4 |
| Heptamer | 1.2 |
| Other | 13.9 |

Yield of cyclic phosphonitrilic chloride was 89.5 percent based on PCl$_3$.

EXAMPLE 4

Following the procedure of Example 1, there was simultaneously added to 1712 parts of monochlorobenzene saturated with HCl, in equimolar amounts, 750 parts of PCl$_3$, 93.7 parts of NH$_3$ and 387 parts of Cl$_2$ over a period of 4 hours. Addition was started after the monochlorobenzene reached 90° C. and reflux was obtained in about 10 minutes thereafter. Again, feed control was not precise but the PCl$_3$ feed was somewhat less than the stoichiometric amount during the addition. Reflux was maintained overnight. The reaction mass was white in color and work-up of the product by cooling to ambient temperature, filtration, and evaporation of the solvent, followed by petroleum ether extraction resulted in 8.1 parts of insoluble linear phosphonitrilic chloride oligomers. Analysis of the cyclic phosphonitrilic chloride mixture by NMR gave the following results:

| Cyclic PNCl$_2$ Oligomer | Percent |
| --- | --- |
| Trimer | 62.4 |
| Tetramer | 9.7 |
| Pentamer | |
| Hexamer | 9.9 |
| Heptamer | 1.6 |
| Other | 16.3 |

Yield of cyclic phosphonitrilic chloride oligomer was 93.8 percent based on PCl$_3$.

EXAMPLE 5

Following the procedure of Example 1, simultaneously 750 parts of PCl$_3$, 94 parts of NH$_3$ and 387 parts of Cl$_2$ were continuously added over a period of 8 hours in equimolal amounts to 1712 parts of monochlorobenzene, saturated with HCl, at 90° C. initially. After 30 minutes from beginning of addition reflux temperature of 129° C. was reached and maintained between 127°–131° C. Feed control was good. After discontinuing reactant feed, reflux conditions were maintained overnight. On work-up of the reaction mass no petroleum ether insoluble material was observed. Analysis of the cyclic phosphonitrilic chloride product by NMR gave the following results:

| Cyclic PNCl$_2$ Oligomer | Percent |
| --- | --- |
| Trimer | 78.4 |
| Tetramer | 10.3 |
| Pentamer | |
| Hexamer | 5.5 |
| Heptamer | 0.9 |
| Other | 5.3 |

Yield of cyclic phosphonitrilic chloride oligomers was 82 percent based on $PCl_3$.

EXAMPLE 6

Following the procedure of Example 1, simultaneously 750 parts of $PCl_3$, 94 parts of $NH_3$ and 387 parts of $Cl_2$ were continuously added over a period of 8 hours, in equimolal amounts, to 1712 parts of monochlorobenzene, saturated with HCl, initially at 95° C. In 30 minutes after addition began, reflux conditions were obtained and the temperature maintained between 128°–132° C. during addition. On completing addition, an additional 500 parts of monochlorobenzene were added to the reaction mixture and reflux conditions were maintained overnight. On work-up of the product, 8.2 parts of petroleum ether insoluble material was obtained. Analysis of NMR of the cyclic phosphonitrilic chloride oligomer mixture gave the following results:

| Cyclic $PNCl_2$ Oligomer | Percent |
| --- | --- |
| Trimer | 77.1 |
| Tetramer | 11.3 |
| Pentamer } | |
| Hexamer } | 5.6 |
| Heptamer | 0.6 |
| Other | 5.3 |

A yield of 89 percent cyclic phosphonitrilic chloride oligomer based on $PCl_3$ was calculated.

It should be noted that efficient control of the feed of phosphorus trichloride, ammonia and chlorine produces substantially no petroleum ether insoluble material. Thus, except for checking a sample of the product, the extraction step conventionally employed in product recovery can be eliminated.

One skilled in the art can envision various changes in the above described process, which is illustrative of the invention, without departing from the scope of the following claims.

What is claimed is:

1. A process for the preparation of phosphonitrilic chloride mixtures containing a high proportion of cyclic trimer and tetramer and substantially no petroleum ether insoluble phosphonitrilic chloride species, said process comprising reacting phosphorus trichloride, chlorine and ammonia in a stirred solvent at a temperature of from about 65° to about 180° C., wherein the reactants are simultaneously added to the solvent at a rate such that the concentration of phosphorus trichloride is at most stoichiometric relative to the concentration of chlorine and ammonia and such that the formation of said petroleum ether insoluble phosphonitrilic chloride species is suppressed and recovering the cyclic phosphonitrilic chloride mixture produced.

2. The process of claim 1 wherein said solvent is a halogenated hydrocarbon having a boiling point in the range of about 65° to about 180° C.

3. The process of claim 1 wherein said solvent is a halogenated benzene.

4. The process of claim 1 wherein said solvent is monochlorobenzene.

5. The process of claim 1 wherein said reactants are added to the reaction mixture in equimolal proportion for a period sufficient to result in a solution of phosphorus trichloride of about 20 to about 50 weight percent in said solvent if no reaction occurred.

6. The process of claim 1 in which said ammonia and said chlorine reactants are added to the reaction mixture below the liquid level and said phosphorus trichloride is fed to the reaction mixture above the liquid level.

7. The process of claim 1 in which the product cyclic phosphonitrilic chloride mixture is recovered by cooling the reaction mixture to ambient conditions, filtering the by-product ammonium chloride from the reaction mixture and distilling off the solvent.

8. The process of claim 7 in which the ammonium chloride filter cake is returned to the reaction vessel for initiating a second reaction for the production of cyclic phosphonitrilic chloride oligomer mixtures.

9. The process of claim 1 wherein said solvent is monochlorobenzene and the temperature of the reaction mixture is maintained for a period up to about 20 hours after the addition of reactants is completed.

10. A process for the preparation of phosphonitrilic chloride mixtures containing a high proportion of cyclic trimeric and tetrameric phosphonitrilic chloride oligomers and substantially no petroleum ether insoluble phosphonitrilic chloride oligomers, said process comprising
    (a) heating an inert solvent saturated with hydrogen chloride with agitation to a temperature sufficient to initiate the reaction of phosphorus trichloride, ammonia and chlorine;
    (b) simultaneously feeding said phosphorus trichloride, chlorine and ammonia to the solvent at a rate such that the phosphorus trichloride concentration is at most stoichiometric relative to the concentration of chlorine and ammonia and such that the formation of said petroleum ether insoluble phosphonitrilic chloride species is suppressed during which feeding the temperature of the reaction mixture is increased to the reflux temperature of said solvent;
    (c) after discontinuing feeding of reactants maintaining the reaction mixture at reflux until hydrogen chloride evolution has ceased and for a period up to about 20 hours thereafter; and
    (d) recovering the cyclic phosphonitrilic chloride mixture produced.

11. The process of claim 10 wherein said inert solvent is a halogenated hydrocarbon having a boiling point in the range of 65° to about 180° C.

12. The process of claim 10 wherein said solvent is a halogenated benzene.

13. The process of claim 10 wherein said solvent is monochlorobenzene.

14. The process of claim 10 in which ammonia and chlorine are added to the reaction mixture below the liquid level and phosphorus trichloride is added to the reaction mixture above the liquid level.

15. The process of claim 10 in which the cyclic phosphonitrilic chloride mixture is recovered by cooling the reaction mixture to ambient conditions, filtering the solid ammonium chloride from the reaction mixture and distilling the solvent from the cyclic phosphonitrilic chloride product mixture.

16. The process of claim 15 wherein said ammonium chloride is returned to the reaction vessel for initiating a second reaction for the production of cyclic phosphonitrilic oligomer chloride mixtures.

17. The process of claim 10 wherein said reactants are added to the reaction mixture in equimolal proportion for a period sufficient to result in a solution of phosphorus trichloride of about 20 to about 50 weight percent in said solvent if no reaction occurred.

* * * * *